Patented Nov. 7, 1933

1,934,009

UNITED STATES PATENT OFFICE 1,934,009

AZODYESTUFF

Albert Schmelzer, Fritz Ballauf and Heinrich Hefner, Elberfeld, Germany, assignors to General Aniline Works, Inc., New York, N. Y., a corporation of Delaware No Drawing. Application July 21, 1930, Serial No. 469,630, and in Germany August 19, 1929

12 Claims. (Cl. 260—86)

The present invention relates to new water insoluble azodyestuffs and to material dyed therewith, and more particularly it relates to azodyestuffs which are obtainable from hydroxy-naphtho-carbazole carboxylic acid arylamides by coupling same with unsulfonated and uncarboxylated diazotized aromatic amines.

The new dyestuffs having most probably the following general formula:

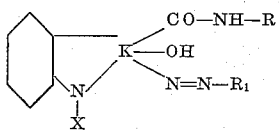

wherein K stands for a naphthalene nucleus which is bound to the carbazole in an $\alpha$, $\beta$-position, R stands for the residue of an amine of the benzene or naphthalene series, $R_1$ stands for the residue of an amine of the benzene-, azo-benzene-, naphthalene-, anthraquinone- or carbazole-series, the groupings —CO—NH—R and –OH stand in ortho position to each other, the groupings —CO—NH—R, —OH and —N=N—$R_1$ stand in that benzene nucleus of the naphthalene nucleus K which is not neighboured to the carbazole ring, X stands for hydrogen or alkyl, and wherein all nuclei may be further substituted by alkyl-, alkoxy- and nitro-groups or halogen are manufactured in the known manner by diazotizing the amine and coupling the diazo compound obtained with the hydroxy-naphtho-carbazole carboxylic acid arylamide in substance, on a substratum or on the fiber.

The new dyestuffs, when produced in substance, are generally brown to black powders, insoluble in water and yield upon reduction with stannous chloride and hydrochloric acid one mol of an amino-hydroxynaphtho-carbazole carboxylic acid arylamide and one mol of an aromatic amine and, in case an amino-azo-benzene compound has been used as diazotization component yield as an additional reduction product a diamine of the benzene series. When produced on the fiber, they give reddish brown to black dyeings of satisfactory fastness properties. The black shades obtained are for instance very fast to rubbing, to chlorination and to boiling. The great advantage of this invention lies in the fact, that in this class of dyestuffs a part of the monoazodyestuffs give black shades when produced on the fiber while up to now black shades could only be produced by using polyazodyestuffs.

As starting materials for the present invention, on the one hand, all unsulfonated and uncarboxylated aromatic amines can be used, as for instance, aniline, toluidines, anisidines, naphthylamines, aminoazotoluenes, aminocarbazoles, aminoanthraquinones, also derivatives thereof, such as halogen, nitro compounds and ethers thereof, on the other hand, all unsulfonated and uncarboxylated hydroxynaphtho-carbazole carboxylic acid arylamides can be used as coupling components.

The following table shows a series of azodyestuffs according to the present invention and the shades obtained when produced on the fiber:

Azodyestuffs derived from $\alpha$-hydroxynaphtho-carbazole carboxylic acid arylamides and diazotized amines according to the general formula:

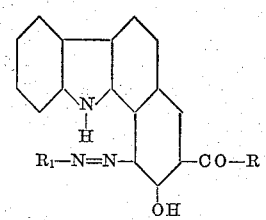

| R | R¹ | Shade |
|---|---|---|
| Anilide | 5-nitro-o-anisidine which product corresponds to the following formula: 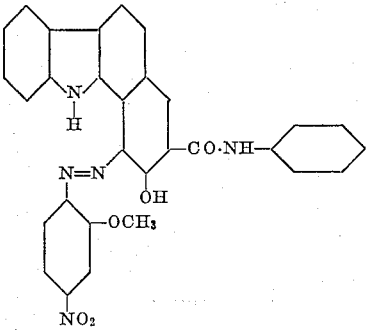 | Reddish-blue-black |
| o-toluidide p-toluidide | 5-nitro-o-anisidine 5-nitro-o-anisidine which product corresponds to the following formula: 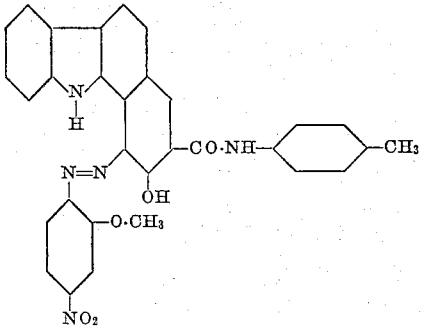 | Bluish black Greenish black |
| o-anisidide p-anisidide | 5-nitro-o-toluidine 5-nitro-o-toluidine which product corresponds to the following formula: 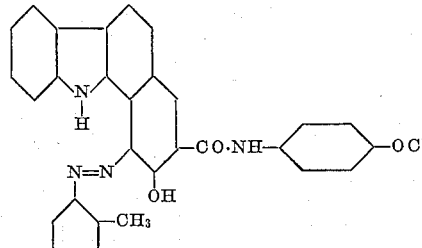 | Reddish black Greenish black |
| p-anisidide | 5-nitro-o-anisidine which product corresponds to the following formula: 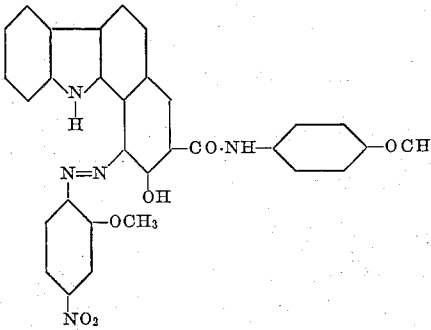 | Greenish black |
| B-naphthylamide p-chloranilide o-methyl-p-anisidide | 5-nitro-o-toluidine Aminoazotoluene 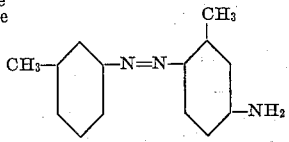 | Deep black Greenish black Bluish black |

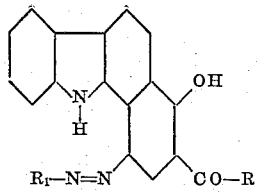

| R | R₁ | Shade |
|---|---|---|
| Anilide | 5-nitro-o-anisidine | Reddish brown |
| o-toluidide | 5-nitro-o-anisidine | Dark brown |
| p-toluidide | 5-nitro-o-anisidine | Reddish brown |
| o-anisidide | 5-nitro-o-toluidine | Greenish brown |
| p-anisidide | 5-nitro-o-toluidine | Blackish brown |
| β-naphthylamide | 5-nitro-o-toluidine | Dark brown |
| p-chloranilide | Aminoazotoluene | Greenish brown |
| o-methyl-p-anisidide | CH₃-C₆H₄-N=N-C₆H₃(CH₃)-NH₂ | Brown |

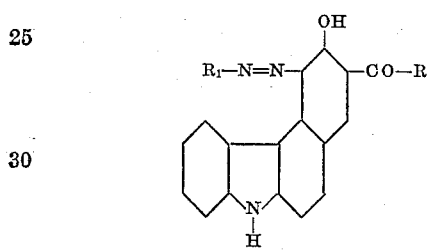

| R | R₁ | Shade |
|---|---|---|
| Anilide | 5-nitro-o-anisidine | Reddish blue black |
| o-toluidide | 5-nitro-o-anisidine | Bluish black |
| p-toluidide | 5-nitro-o-anisidine | Greenish black |
| o-anisidide | 5-nitro-o-toluidine | Reddish black |
| p-anisidide | 5-nitro-o-toluidine | Greenish black |
| β-naphthylamide | 5-nitro-o-toluidine | Deep black |
| p-chloranilide | Aminoazotoluene | Greenish black |
| o-methyl-p-anisidide | CH₃-C₆H₄-N=N-C₆H₃(CH₃)-NH₂ | Bluish black |

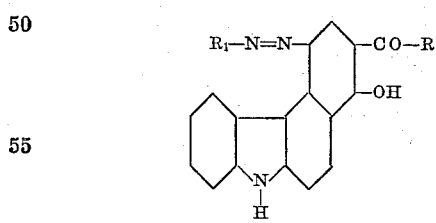

| R | R₁ | Shade |
|---|---|---|
| Anilide | 5-nitro-o-anisidine | Reddish brown |
| o-toluidide | 5-nitro-o-anisidine | Dark brown |
| p-toluidide | 5-nitro-o-anisidine | Reddish brown |
| o-anisidide | 5-nitro-o-toluidine | Greenish brown |
| p-anisidide | 5-nitro-o-toluidine | Blackish brown |
| β-naphthylamide | 5-nitro-o-toluidine | Dark brown |
| p-chloranilide | Aminoazotoluene | Greenish brown |
| o-methyl-p-anisidide | CH₃-C₆H₄-N=N-C₆H₃(CH₃)-NH₂ | Brown |

By the replacement of the H-atom attached to the N-atom of the carbazole ring system by alkyl and also by the replacement of the H-atoms in the different nuclei of the carbazole ring system by other substituents, such as halogen, an alkyl and nitro group no or only a very slight alteration of the shade is produced.

The following examples illustrate the mode of producing the new dyestuffs on the fiber, but do not restrict the invention thereto:

*Example 1.*—Cotton-yarn boiled and dried is impregnated with a solution containing per liter 3.8 grams of the toluidide of alpha-naphthocarbazole-5-hydroxy o-carboxylic acid, 20 ccs. of caustic soda lye of 34° Bé. and 25 ccs. of Turkey-red oil. The yarn is then rinsed and without drying the dyestuff is developed on the fiber with a diazo-solution which has been neutralized with sodium acetate and contains per liter 2 grams of diazotized 2.5-dichloroaniline. After rinsing and soaping a fast beautiful yellowish (cutch) is obtained.

*Example 2.*—20 grams of cotton yarn boiled and dried are impregnated with a solution which is prepared as follows: 1 gram of α-naphthocarbazole-5-hydroxy-o-carboxylic acid-anilide, 2 grams of ethyl-alcohol, 0.5 gram of caustic soda lye of 38° Bé., 1 gram of water are well mixed; the clear solution obtained is mixed by stirring with 400 grams of water containing 2.5 grams of caustic soda lye of 38° Bé. and 3 grams of Turkey-red oil. The yarn is then rinsed and without drying the dyestuff is developed on the fiber with a diazo-solution which has been neutralized with sodium acetate and contains per liter 2 grams of 5-nitro-2-anisidine. After rinsing and soaping a fast beautiful reddish black is obtained.

We claim:

1. Azodyestuffs of the general formula:

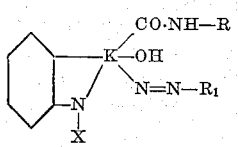

wherein K stands for a naphthalene nucleus which is bound to the carbazole in an α,β-position, R stands for the residue of an amine of the benzene or naphthalene series, R₁ stands for the residue of an amine of the benzene-, azobenzene, naphthalene-, anthraquinone- or carbazole-series, the groupings —CO—NH·R and —OH stand in ortho position to each other, the groupings —CO—NH·R, —OH and —N=N—R₁ stand in that benzene nucleus of the naphthalene nucleus K which is not neighboured to the carbazole ring, X stands for hydrogen or alkyl, and wherein all nuclei may be further substituted by alkyl-alkoxy- and nitro-groups or halogen, said dyestuffs yielding when produced on the fiber reddish brown to deep black shades of satisfactory fastness properties, when produced in substance being dark brown to black powders being insoluble in water, and yielding upon reduction with hydrochloric acid and stannous chloride one mol of an aminohydroxynaphthocarbazole carboxylic acid arylamide and one mol of an aromatic amine and, in case R₁ stands for the radical of an azo-benzene, yielding as an additional reduction product a diamine of the benzene series.

2. Monoazo dyestuffs of the general formula:

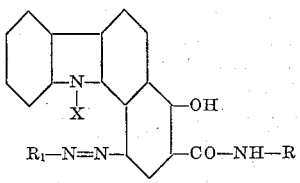

wherein R stands for the residue of an amine of the benzene or naphthalene series, $R_1$ stands for the residue of an amine of the benzene-, azo-benzene-, naphthalene-, anthraquinone- or carbazole-series, the groupings —CO—NH—R and —OH stand in ortho position to each other, X stands for hydrogen or alkyl, and wherein all nuclei may be further substituted by alkyl-, alkoxy- and nitro-groups or halogen, said dyestuffs yielding when produced on the fiber reddish brown to deep black shades of satisfactory fastness properties, when produced in substance being dark brown to black powders, and yielding upon reduction with hydrochloric acid and stannous chloride one mol of an amino-hydroxynaphthocarbazole carboxylic acid arylamide and one mol of an aromatic amine and, in case $R_1$ stands for the radical of an azo-benzene, yielding as an additional reduction product a diamine of the benzene series.

3. Azo dyestuffs of the general formula:

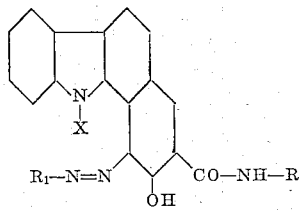

wherein R stands for the residue of an amine of the benzene or naphthalene series, $R_1$ stands for the residue of an amine of the benzene-, azo-benzene-, naphthalene-, anthraquinone- or carbazole-series, X stands for hydrogen or alkyl, and wherein all nuclei may be further substituted by alkyl-, alkoxy- and nitro-groups or halogen, said dyestuffs yielding when produced on the fiber reddish brown to deep black shades of satisfactory fastness properties, when produced in substance being dark brown to black powders, and yielding upon reduction with hydrochloric acid and stannous chlorine one mole of a 2-amino-3-hydroxynaphthocarbazole-4-carboxylic acid arylamide and one mol of an aromatic amine and, in case $R_1$ stands for the radical of an azo-benzene, yielding as an additional reduction product a diamine of the benzene series.

4. The azo dyestuff of the probable formula:

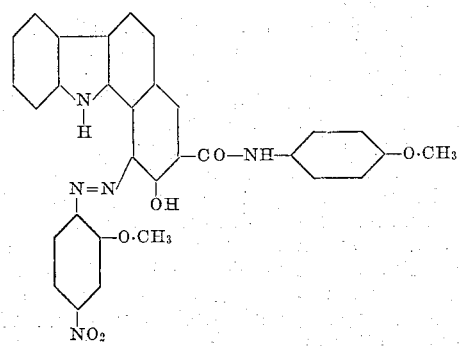

said dyestuff yielding when produced on the fiber greenish black shades of good fastness properties, when produced in substance being a black powder, yielding upon reduction with hydrochloric acid and stannous chloride one mol of ortho-methoxy-para-phenylene diamine and one mol of 2-amino-3-hydroxynaphthocarbazole-4-carboxylic acid para-anisidide.

5. Fiber dyed with an azodyestuff as described in claim 1.

6. Fiber dyed with an azodyestuff as described in claim 2.

7. Fiber dyed with an azodyestuff as described in claim 3.

8. Fiber dyed with the azodyestuff described in claim 4.

9. The azo dyestuff of the probable formula:

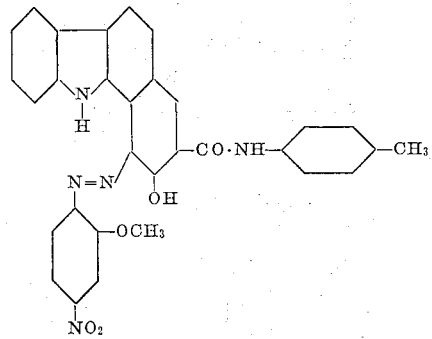

said dyestuff yielding when produced on the fiber greenish black shades of good fastness properties, when produced in substance being a black powder, yielding upon reduction with hydrochloric acid and stannous chloride one mol of ortho-methoxy-para-phenylene diamine and one mol of 2-amino-3-hydroxynaphthocarbazole-4-carboxylic acid para-toluidide.

10. The azo dyestuff of the probable formula:

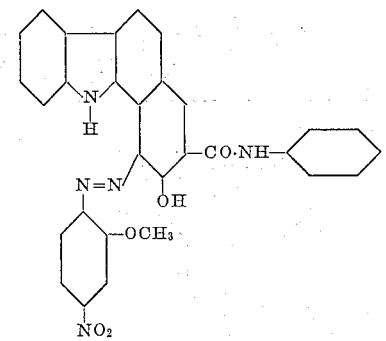

said dyestuff yielding when produced on the fiber reddish blue black shades of good fastness properties, when produced in substance being a black powder, yielding upon reduction with hydrochloric acid and stannous chloride one mol of ortho-methoxy-para-phenylene diamine and one mol of 2-amino-3-hydroxynaphthocarbazole-4-carboxylic acid para-anilide.

11. Fiber dyed with the dyestuff described in claim 9.

12. Fiber dyed with the dyestuff described in claim 10.

ALBERT SCHMELZER.
FRITZ BALLAUF.
HEINRICH HEFNER.